(12) United States Patent
Buerger et al.

(10) Patent No.: US 11,179,843 B2
(45) Date of Patent: Nov. 23, 2021

(54) METHOD FOR OPERATING A ROBOT IN A MULTI-AGENT SYSTEM, ROBOT, AND MULTI-AGENT SYSTEM

(71) Applicant: Robert Bosch GmbH, Stuttgart (DE)

(72) Inventors: Mathias Buerger, Stuttgart (DE); Philipp Christian Schillinger, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/764,383

(22) PCT Filed: Dec. 13, 2018

(86) PCT No.: PCT/EP2018/084807
§ 371 (c)(1),
(2) Date: May 14, 2020

(87) PCT Pub. No.: WO2019/121338
PCT Pub. Date: Jun. 27, 2019

(65) Prior Publication Data
US 2020/0276699 A1 Sep. 3, 2020

(30) Foreign Application Priority Data
Dec. 22, 2017 (DE) .......................... 102017223717.1

(51) Int. Cl.
*B25J 9/00* (2006.01)
(52) U.S. Cl.
CPC .................................. *B25J 9/0084* (2013.01)
(58) Field of Classification Search
CPC ...... B25J 9/0084; B25J 9/1664; B25J 9/1682; B25J 9/1669; B25J 9/1602;
(Continued)

(56) References Cited

U.S. PATENT DOCUMENTS 6,415,274 B1 7/2002 Goldsmith
7,171,441 B2 * 1/2007 Shiouchi ............. H04L 63/0823
709/202

(Continued)

FOREIGN PATENT DOCUMENTS

DE 10220085 B 11/2003
DE 102016002194 A1 8/2016
(Continued)

OTHER PUBLICATIONS

Koenig et al, The Power of Sequential Single-Item Auctions for Agent Coordination, AAAI, Proceedings of the National Conference on Artificial Intelligence—AAAI 2006, Jan. 1, 2006, (Jan. 1, 2006), pp. 1625-1629, XP055574443 (Year: 2006).*

(Continued)

*Primary Examiner* — Jaime Figueroa
(74) *Attorney, Agent, or Firm* — Norton Rose Fulbright US LLP; Gerard Messina (57) ABSTRACT

A method for operating a multi-agent system having a plurality of robots. Each of the robots execute the following method cyclically until a target system state is achieved: starting from an instantaneous system state, determining possible options where progress is made along a path of system states in a predefined, deterministic finite automaton; the options defining actions through which a transition from a current to a subsequent system state can be achieved; determining a cost value for each of the possible options to carry out an action specified by the option; performing an auction, the cost values ascertained for each option being considered by each of the remaining robots; and executing an action, which corresponds to one of the options, as a function of all of the cost values which are determined or received for the respective option.

13 Claims, 4 Drawing Sheets

(58) Field of Classification Search
CPC .... G06Q 10/06312; G05B 2219/23289; G05B 2219/39146
USPC .................................................. 700/245–258
See application file for complete search history.

(56) References Cited

U.S. PATENT DOCUMENTS

| | | | | |
|---|---|---|---|---|
| 7,194,337 | B2* | 3/2007 | Sharma | G05D 23/1931 156/200 |
| 8,112,176 | B2* | 2/2012 | Solomon | G05D 1/0088 700/245 |
| 9,311,670 | B2* | 4/2016 | Hoffberg | G06Q 30/08 |
| 9,733,646 | B1* | 8/2017 | Nusser | B65G 1/137 |
| 2001/0042123 | A1* | 11/2001 | Moody | G06F 9/4875 709/226 |
| 2003/0149578 | A1* | 8/2003 | Wong | G06Q 10/087 705/7.22 |
| 2004/0162638 | A1* | 8/2004 | Solomon | F41H 13/00 700/247 |
| 2005/0005272 | A1 | 1/2005 | Moody et al. | |
| 2007/0287473 | A1* | 12/2007 | Dupray | H04W 4/029 455/456.1 |
| 2010/0280631 | A1 | 11/2010 | Lu et al. | |
| 2015/0148951 | A1* | 5/2015 | Jeon | G05D 1/0219 700/248 |
| 2016/0129592 | A1* | 5/2016 | Saboo | B25J 5/007 700/248 |
| 2017/0277195 | A1 | 9/2017 | Frazzoli et al. | |
| 2018/0326581 | A1* | 11/2018 | Baroudi | G06N 3/008 |

FOREIGN PATENT DOCUMENTS

| | | |
|---|---|---|
| JP | 2009134652 A | 6/2009 |
| JP | 2009136932 A | 6/2009 |
| JP | 2017530873 A | 10/2017 |

OTHER PUBLICATIONS

International Search Report for PCT/EP2018/084807, dated Apr. 3, 2019.
S Koenig et al., "The Power of Sequential Single-Item Auctions for Agent Coordination", AAAI 2006, 2006, pp. 1625-1629. http://idm-lab.org/bib/abstracts/papers/aaai06-nectar.pdf XP055574443.
Saniem Sariel et al., "Real Time Auction Based Allocation of Tasks for Multi-Robot Exploration Problem in Dynamic Environments", AAAI 2005, 2005, pp. 1-7. https://www.aaai.org/papers/workshops/2005/ws-05-0 6/ws05-06-004.pdf XP055574447.
Zhang Yu et al., "Comparison of Auction-Based Methods for Task Allocation Problem in Multi-Robot Systems", 2013 IEEE International Conference on Robotics and Biomimetics (ROBIO), IEEE, 2013, pp. 2609-2613. XP032579653.
Lacerda Bruno et al., "Optimal and Dynamic Planning for Markov Decision Processes With Co-Safe LTL Specifications", 2014 IEEE/RSJ International Conference on Intelligent Robots and Systems, IEEE, 2014, pp. 1511-1516. XP032677065.
Ding, Xu Chu, et al., "LTL Control in Uncertain Environments With Probabilistic Satisfaction Guarantees", In: 18th IFAC World Congress (IFAC'11), BD. 44, 2011, H. 1, pp. 3515-3520.
Guo, Meng, et al., "Multiagent Plan Reconfiguration Under Local LTL Specifications", In International Journal of Robotics Research, The, BD. 34, 2015, H. 2, pp. 218-235.
Langoudakis, Michail G., et al., "Auction-Based Multi-Robot Routing", In: Thrun, Sebastian, Sukhatme, Gaurav Suhas, Schaal, Stefan (HRSG.): Proceedings of Robotics: Science and Systems 1, 2005, pp. 343-350.

* cited by examiner

METHOD FOR OPERATING A ROBOT IN A MULTI-AGENT SYSTEM, ROBOT, AND MULTI-AGENT SYSTEM

FIELD

The present invention relates to multi-agent systems, and, in particular to methods for controlling robots of a multi-agent system by distributing tasks using a cooperative auction method.

BACKGROUND INFORMATION

It is difficult to coordinate a team of robots to jointly manage a task, particularly under uncertainties of the operating environment conditions, as well as under temporal dependencies in the task specification. Breaking down the task specification into subtasks requires appropriate mechanisms for analyzing the task specification, in particular, the uncertainties of the real operating environment preventing the action instructions from being assigned satisfactorily to the individual robots.

A description language, what is generally referred to as linear temporal logic (LTL), is available for mapping temporal dependencies among individual actions of robots. It maps a task specification in the form of an LTL specification. From the LTL specification, action plans, i.e. a set of action instructions for the individual robots may be derived in a generally conventional manner.

LTL for robot applications allows the integration of temporal boundary conditions in probabilistic models, in particular those that include Markov decision processes (MDP). Markov decision processes make it possible to map uncertainties, including unknown time durations for executing actions and stochastic events in the environment.

To plan action instructions for LTL specifications under uncertainty, in "Optimal and dynamic planning for Markov decision processes with co-safe LTL Specifications," Int. Conf. on Intelligent Robots and Systems, pp. 1511-1516, IEEE, 2014, Lacerda, D. Parker, and N. Hawes describe a planning for an individual robot which combines an automaton representation of the task specification with an MDP. In the same manner, in "LTL control in uncertain environments with probabilistic satisfaction guarantees," IFAC, 44(1): 3515-3520, 2011, C. D. Ding, S. L. Smith, C. Belta, and D. Rus provide for planning action instructions for individual robots in order to maximize a use of an LTL task description.

In "Auction-Based Multi-Robot Routing" in Robotics: Science and Systems, pp. 343-350, Rome, Italy, 2005, M. G. Lagoudakis et al describe a plurality of auction strategies, where the focus is on efficiency, for coordinating a plurality of robots independently of a specific model. In "The power of sequential single-item auctions for agent coordination," National Conference on Artificial Intelligence, volume 21, p. 1625, Menlo Park, Calif.; Cambridge, Mass.; London; AAAI Press; MIT Press; 1999, 2006, Koenig, C. et al, describe a sequential auction for reducing planning effort without arbitrarily degrading the optimization result. In "Multi-agent plan reconfiguration under local LTL specifications," International Journal of Robotics Research, 34(2): 218-235, 2015, M. Guo and D. V. Dimarogonas describe assigning local subtasks independently of one another and communicating actively arising conflicts to robots of a multirobot system.

Not available at the present time are efficient planning algorithms for coordinating robots of a multi-agent system in a non-deterministic environment to solve tasks having time-dependent specifications.

SUMMARY

The present invention provides a method for operating a robot in a multi-agent system, as well as a robot and a multi-agent system.

Example embodiments of the present invention are described herein.

In accordance with a first aspect of the present invention, an example method is provided for operating a multi-agent system having a plurality of robots, each of the robots executing the following method cyclically until a target system state is achieved:

starting from an instantaneous system state, determining possible options where progress is made along a path of system states in a predefined, deterministic finite automaton, the options defining actions which render possible a transition from a current to a subsequent system state;

determining a cost value for each of the possible options to carry out an action specified by the option;

performing an auction, each of the remaining robots considering the cost values ascertained for each option;

executing an action which corresponds to one of the options, as a function of all of the cost values determined or received for the option in question.

In the example method for operating a multi-agent system having a plurality of robots (agents), a deterministic finite automaton is provided, which defines the task specification to be solved by a multi-agent system. The deterministic finite automaton has a plurality of system states which define one or a plurality of state paths that must be passed through to achieve the task objective. In this deterministic finite automaton, the state transitions are assigned to different robots in an auction method, only those state transitions (relevant state transitions) being considered as options, which achieve a change in a progress level in the direction of the task objective. In the following, these state transitions are referred to as options. To that end, corresponding progress levels, which steadily rise along the paths to the target state, are assigned in advance to the system states of the deterministic finite automaton.

In the process of assigning the state transitions, which are characterized by an increase in a progress level, to individual robots, subtasks, which lead to state changes, may be assigned as options to the individual robots. With the aid of a suitable cost function, such an auction method makes it possible to assign a subtask to those robots which are able to perform the subtask in question at the lowest costs. A cost function may, in particular take into consideration the time required for performing the subtask in question, as well as the probability that the defining condition for the system state is fulfilled when the subtask is performed.

If a system state condition for a system state having an increased progress level is fulfilled by the subtask, all ongoing subtasks of the robots are interrupted and a renewed auction is performed in which, at this stage, new options are distributed to the robots. The new options thereby correspond to the relevant state transitions originating from the system state that is achieved at this stage. This method is carried out until the target state is achieved. In this manner, subtasks may be efficiently distributed in a multi-agent system, it being possible, in particular to consider temporal dependencies in an especially efficient way.

By indicating the deterministic finite automaton to all robots, each of the robots is able to determine its options with regard to the higher-level task objective, a much less complex, probabilistic planning problem thereby needing to be resolved. Because of the decentralized auction scheme, the various options are assigned to different robots, the provided auction algorithm making it possible for the robots to perform subtasks that are temporally dependent on other subtasks. Each time a subtask is fulfilled, the method is carried out again, making possible an up-to-date consideration of the knowledge about system states.

The example method still allows a linear implementation, since, in particular, subtasks do not need to be assigned to robots in advance. Overall, therefore, the decentralized method of coordinating a plurality of robots in an uncertainty-fraught system environment makes it possible to implement a predefined task specification, for example, in the form of a linear temporal logic (LTL), in particular of a co-safe LTL.

The example method according to the present invention makes it efficiently possible to coordinate the supplementation of a multi-agent system, in particular in the case of uncertainties in the environmental conditions. This is particularly true of specifications that include temporal logic that is to be processed by the entire team of robots. To that end, subtasks of the task specification are automatically assigned to the robots. The circumstances of the system environment may also be considered by regular updating of the planned take-action instructions, allowing the robots to be flexibly adapted to the uncertainties.

In addition, an action may be carried out that corresponds to one of the options when a cost value associated therewith is ascertained, which indicates the lowest costs of all cost values received for the relevant option.

In accordance with the example embodiment of the present invention, it may also be provided that no action corresponding to one of the options be taken when there is no intrinsic cost value determined for any of the options which indicates the lowest costs of all cost values received for the relevant option.

In addition, an action may be carried out for a further option along the path in the deterministic finite automaton when an intrinsic cost value indicating the lowest costs of all cost values received for the relevant option, is not ascertained for any of the options, and the further option being selected in such a way that implementing the actions of the options distributed in the auction is not negatively affected by the pursuit of an action that corresponds to one of the further options.

In accordance with the present invention, it may be provided that the cost value for an option be ascertained as a function of a period of time for executing the action associated with the option and/or of a probability that, upon execution of the action associated with the option, a state condition for the system state is achieved that leads to the option.

In particular, a probability of a state condition for obtaining the system state being achieved upon execution of an action associated with an option, may be updated while the action is executed.

In accordance with a specific embodiment of the present invention, the progress along the path of system states of the deterministic finite automaton may be achieved when there is no possibility that fulfilling a condition of the subsequent system state makes one of the preceding system states attainable; progress levels, which indicate the progress along the path of system states of the deterministic finite automaton, being assigned to the system states, in particular.

Upon completion of an action, it may be provided that the system state obtained be communicated to the remaining robots.

It may be provided for an execution of an action to be interrupted or completed in response to information about a subsequent system state being received.

In addition, the cost values ascertained for each option are provided by each of the remaining robots explicitly communicating costs.

In accordance with another aspect of the present invention, an example robot is provided for operating a multi-agent system, the robot being adapted for cyclically executing the following steps until a target system state is achieved:

starting from an instantaneous system state, determining possible options, where progress is made along a path of system states in a predefined, deterministic finite automaton, the options defining actions which render possible a transition from a current to a subsequent system state;

determining a cost value for each of the possible options to carry out an action specified by the option;

receiving the cost values ascertained for each option from each of the remaining robots;

performing an auction, taking into account the cost values ascertained for each option; and executing an action, which corresponds to one of the options, as a function of all of the cost values ascertained for the relevant option.

In accordance with another aspect of the present invention, a example multi-agent system having a plurality of the above robots is provided.

BRIEF DESCRIPTION OF THE DRAWINGS

Specific embodiments are explained in greater detail below with reference to the figures.

DETAILED DESCRIPTION OF EXAMPLE EMBODIMENTS

The following describes an example method in accordance with the present invention where, in a multi-agent system, agents are provided as robots that interact with the environment. Robots 1 have a configuration that is shown schematically in FIG. 1. To that end, robots 1 each include a control unit 2 which is designed for executing subtasks. Furthermore, to communicate with other robots 1, each of robots 1 has a communication device 3 for transmitting information to other robots 1 and for receiving it therefrom.

Figure 1:
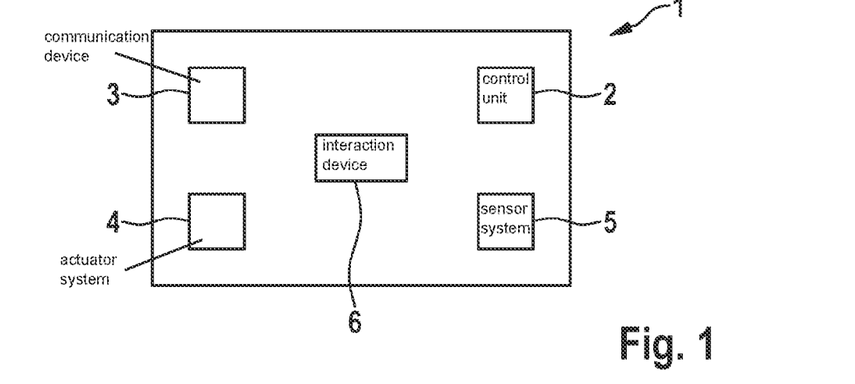
FIG. 1 is a schematic representation of a robot of a multi-agent system.

With the aid of an actuator system 4, robot 1 is able to interact with the system environment. Actuator system 4 may include a conveyance actuator, gripper actuator and the like, for example, which are operated in a generally conventional manner in accordance with the subtask assigned to robot 1. Robot 1 is thereby able to move, pick up and set down objects and the like.

Furthermore, a sensor system 5 may be used to record environmental states. Sensor system 5 may include a camera, a different sensor system that may be used for detecting objects, for example, such as an ultrasonic sensor system, for example, and the like. With the aid of the camera, positions of objects, which may/should be interacted with, may be recognized and identified, and a movement within the system environment may be rendered possible, objects, which represent obstacles, being bypassed.

Moreover, robots 1 may be provided with an interaction device 6, such as a touch display or a speech input/output device, for example, in order to communicatively interact with objects or persons in the environment. This makes it possible for people to make inputs to robots 1 and receive information.

The initial point of the example method described below is a task specification in the form of a linear temporal logic (LTL), thus, in particular of a co-safe linear temporal logic (scLTL). This represents a description language for a task specification of a task to be solved which has temporal modalities. Each scLTL task specification may be translated into a deterministic finite automaton (DFA).

Figure 2:
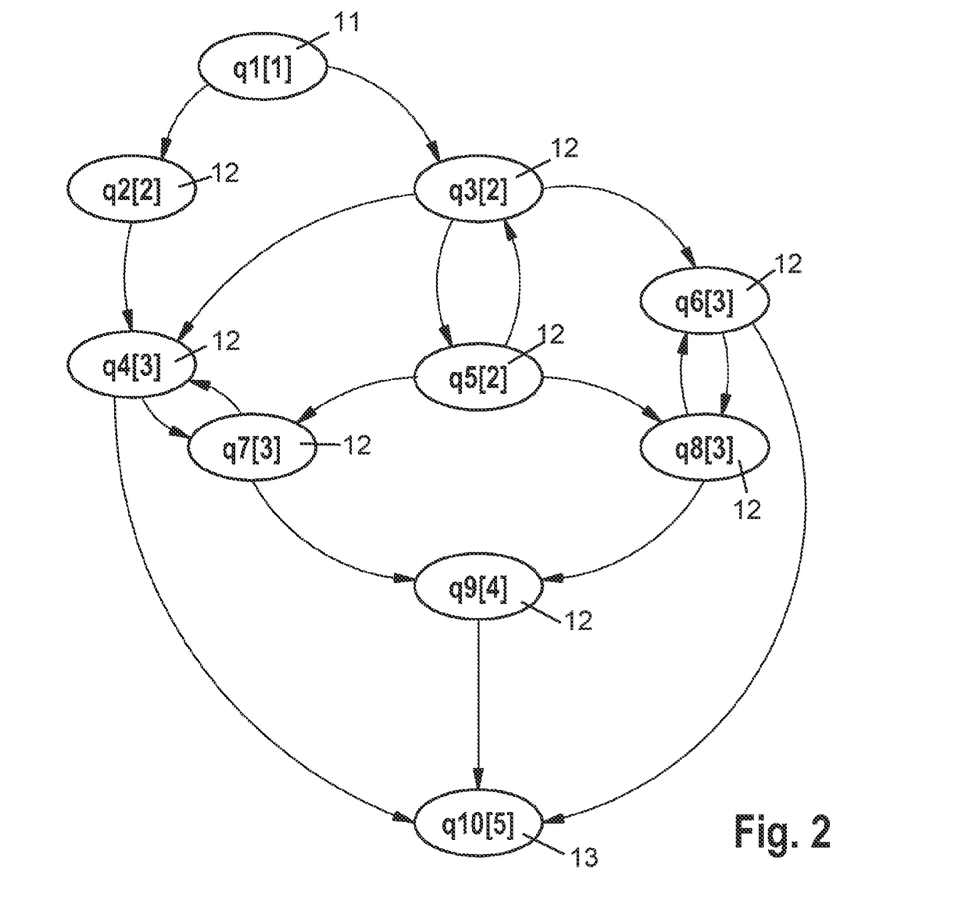
FIG. 2 is a representation of a deterministic finite automaton that includes progress level assignment.

Such a deterministic finite automaton (DFA) is shown exemplarily in FIG. 2. It shows system states (q1-q10), which include an initial state 11 (q1), a plurality of intermediate states 12 (q2-q9) and one or a plurality of target states 13 (q10). In the graphic representation for illustrating the deterministic finite automaton, arrows show state transitions from initial state 11 (q1) to target state 13 (q10) along one or a plurality of paths. A system state is achieved when a state condition assigned to the respective system state is fulfilled. The system states from initial state 11 to target state 13 are achieved by progress along the path. Progress along one of the paths is made when there is no chance of a return path from a system state to a subsequent system state. The progress along the paths is indicated by progress levels, in particular by rising progress levels.

Figure 3:
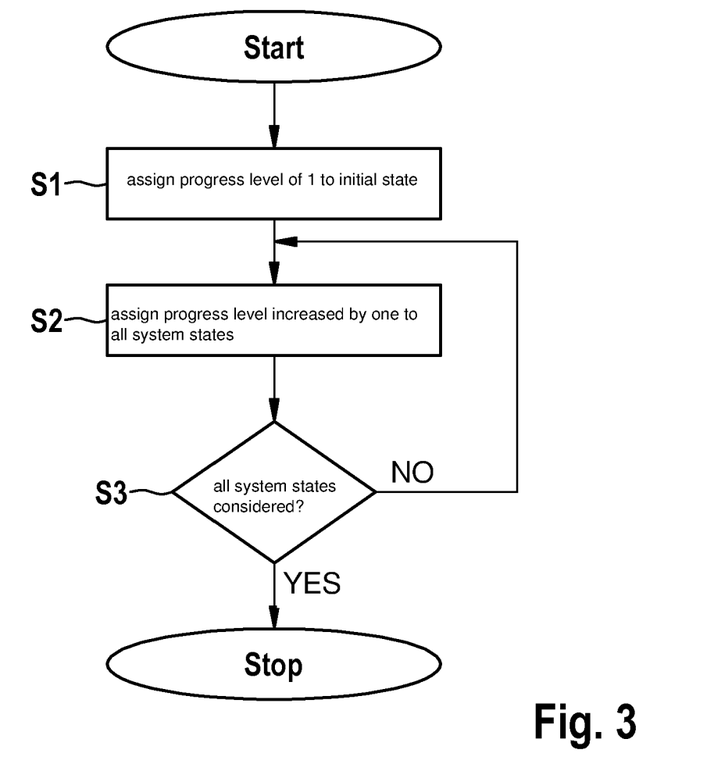
FIG. 3 is a flow chart for illustrating the assignment of progress levels to individual system states of the deterministic finite automaton.

To prepare the example auction method, these progress levels are assigned, starting with initial state 11 to target state 13, in accordance with a method illustrated in the flow chart of FIG. 3. In step S1, a progress level of 1 (or another initial value) may thereby be assigned to initial state 11.

In a subsequent step S2, a progress level increased by one (or some other amount) is assigned for all system states, which are attainable from a selected current system state (beginning with the initial state) of a selected current system state and of which no path leads back to the current or any other previous system state (i.e., relevant state transitions). The remaining system states, which are achieved by non-relevant state transitions (i.e., state transitions of states to which a path in the DFA leads back), are assigned to the respective current, identical progress-level system state. Each system state, from which a path leads back to the previous state, is thereby assigned the same progress level as the progress level of the preceding system state.

Step S3 queries whether all system states were considered. If this is the case (alternative: yes), the method is complete; otherwise (alternative: no), the system branches back to step S2, and a next system state that is not yet processed is assumed in this instance to be the current system state. In this manner, each of the system states from the deterministic finite automaton may have a progress level (indicated by [x], where x is the number of the progress level) assigned thereto. On the basis of the deterministic finite automaton DFA, which is thus provided with progress levels, a method may be executed at this stage that a plurality of robots use to process the respective task specification.

Figure 4:
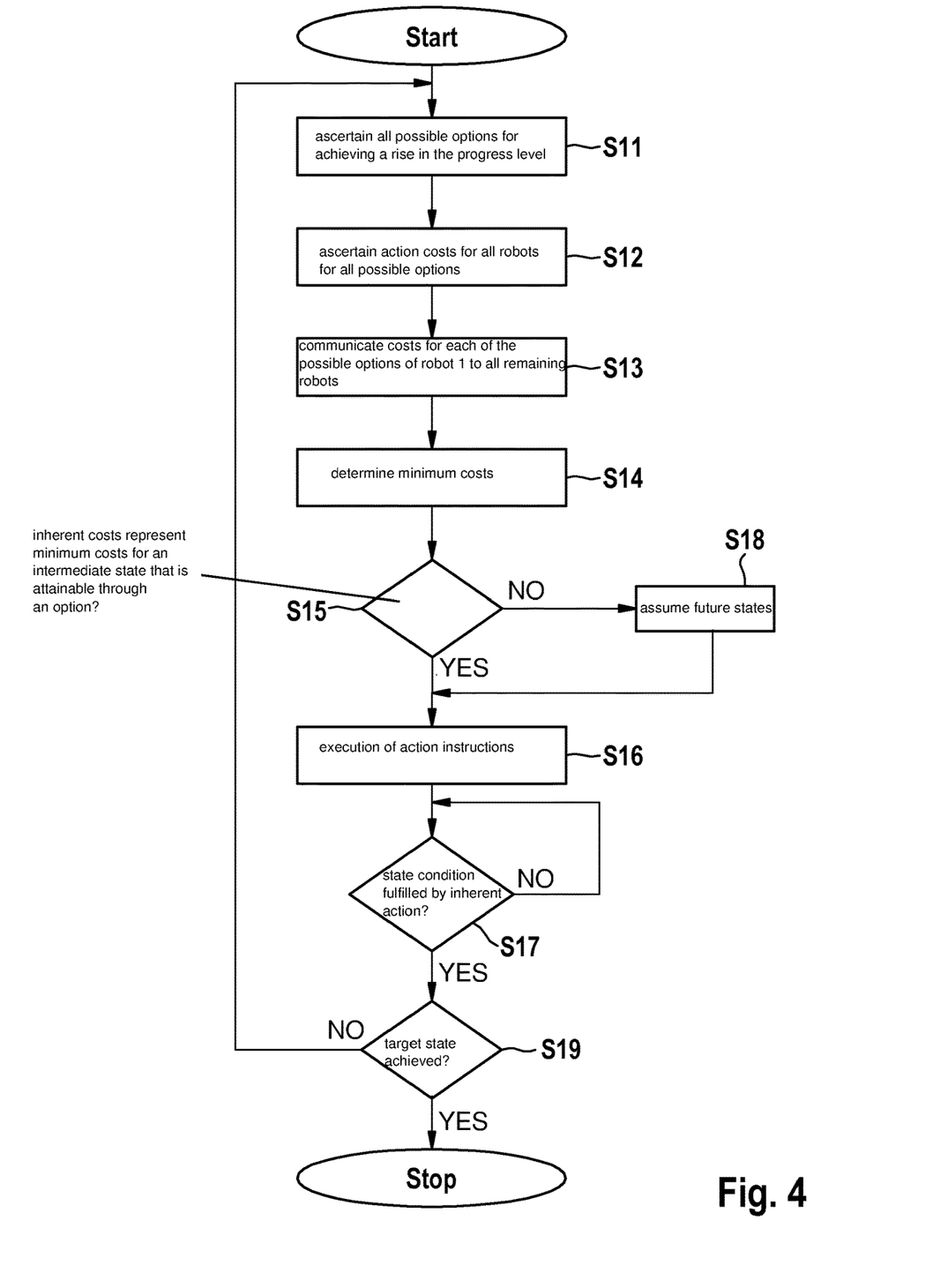
FIG. 4 is a flow chart for illustrating a method for operating the multi-agent system to solve a task specification of existing tasks.

In one example method for operating the multi-agent system, it is required that each robot 1 be able to communicate with each of remaining robots 1, and that the deterministic finite automaton DFA be made known to each robot 1. The following example method describes the functional sequence in one of robots 1; in general, the method being executed in parallel in each of robots 1.

Proceeding from the instantaneous state in the deterministic finite automaton, in particular upon the first cycle through initial state 11, all possible options for achieving a rise in the progress level are initially ascertained in step S11. The options (presented as state transitions to a system state having a higher progress level) provide possibilities for achieving a next possible system state of the DFA, which represents an intermediate state on the way to target state 13. In the present case, starting from initial state q1, system states q2 and q3 represent the next possible system states. This corresponds to options q1→q2 and q1→q3.

In step S12, action costs are ascertained at this stage for each of robots 1 for all of the possible options determined in step S1. The action costs may, for example, correspond to a time period for executing the respective option for robot 1 in question or include the same. Furthermore, under an uncertainty-fraught system environment, the action costs may take probabilities into account. In each particular case, the probabilities indicate a probability of the state condition being fulfilled for the system state to be achieved when respective robot 1 executes the option in question. It holds that: $K=t*p$ (t being the estimated period of time for executing the option and p the probability of the state condition of the respective option being fulfilled).

In step S13, the thus ascertained costs are communicated at this stage for each of the possible options of robot 1 in question to all remaining robots 1. Thus, information about the costs for each of the options is available in all robots 1.

In step S14, for each possible system state that is attainable by one of the options that are self-determined or obtained from other robots 1, the minimum costs are determined at this stage.

In each of robots 1, step S15 subsequently checks whether the inherent costs represent the minimum costs for an intermediate state that is attainable through an option. If this is the case (alternative: yes), respective robot 1 accepts the relevant option (having the lowest costs) and converts it into action instructions to achieve the system state indicated by the option. The method is subsequently continued in step S16.

Accordingly, step S16 immediately begins execution of the action instructions.

In each robot 1, step S17 checks whether the state condition is fulfilled by the inherent action, or whether relevant information about a fulfilled state condition is received by another one of the robots. If this is not the case (alternative: no), the system branches back to step S17; otherwise (alternative: yes) the system branches to step S19.

Step S19 checks whether the target system state has been achieved. If this is the case (alternative: yes), the method is complete. Otherwise, the system branches back to step S11.

If step S15 ascertains for each of the options that none of the minimum cost options are able to be carried out (alternative: no), the method is continued in step S18.

If the minimum costs are the same, a plurality of robots 1 may possibly select one of the options at the same time and simultaneously carry out the respective action instructions. The assignment process either assigns each robot 1 an option, in accordance with which it is able to execute action instructions, or it remains inactive.

During the auction, robots 1 may assume future states in step S18 in order to plan action instructions that they may follow to prepare future parts of the task. It is intended that this take place by ensuring that following these action instructions does not negatively affect the implementation of the subtasks of the instantaneous options. Thus, to distribute options to unassigned robots 1, further options are considered, which have a system state having a higher progress level than the currently executed options and do not include the result of the executed option as a prerequisite.

Due to the uncertainty of the environment, it is not clear in advance how the implementation of the subtasks will continue. Robots 1 are, therefore, able to update the action instructions thereof during execution in two ways:

1. When the option of a robot 1 is complete, the current state of each further robot 1 is updated. Since this causes the state of each robot 1 to be modified, the previously executed action instruction is interrupted.
2. Knowledge that robots 1 collect during execution is considered. This makes it possible to adapt the event probabilities, which indicate that a particular event may be observed. These updated probabilities are communicated to each of robots 1 and taken into account when the costs of the individual options are determined.

Figure 5:
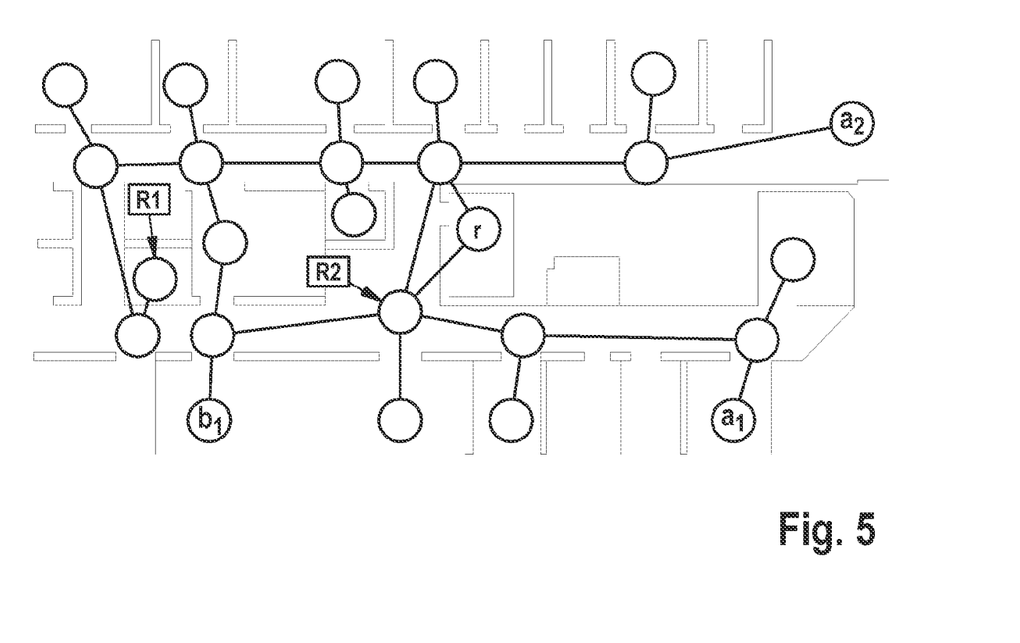
FIG. 5 is an example of a multi-agent system having two mobile robots that is located in a system environment.

FIG. 5 shows an example of a multi-agent system where mobile robots R1, R2 are located in an office building. The objective is for one of robots 1 to move into a space r, which, however, is only possible after permission has been granted by two people a, b. A person may grant this permission, for example, by entering an access code via a touch screen of an interaction device 6 of individual robot 1. This example assumes that the people may be situated at locations a2 and b1. However, this is not known in advance. Furthermore, it is assumed that the period of time for carrying out a navigation action is proportional to the distance covered. The objective of obtaining access to space r while the access restrictions are considered, may be expressed by the following scLTL formula.

$$\phi = \Diamond r \wedge (\neg r \, \mathcal{U} \, a_c) \wedge (\neg r \, \mathcal{U} \, b_c)$$

$a_c$, $b_c$ indicating that respective people a, b have given permission.

Figure 6:
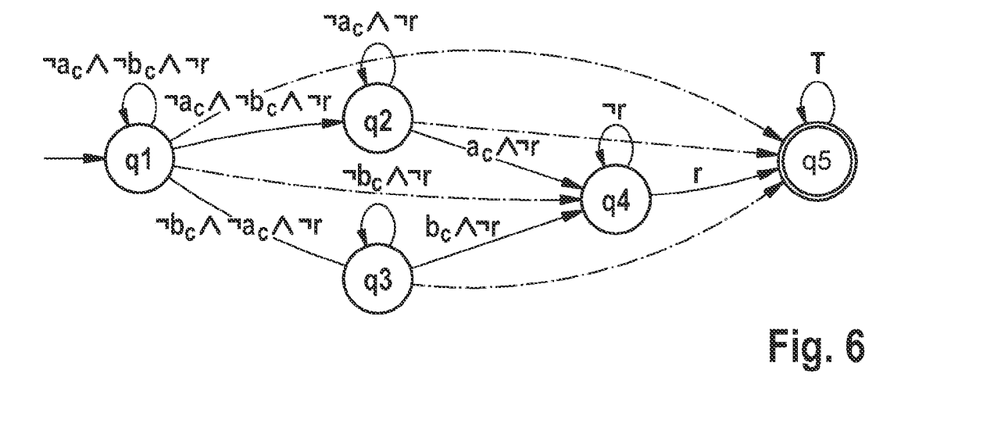
FIG. 6 is a representation of a deterministic finite automaton for solving a task of the multi-agent system of FIG. 5.

The DFA, which is constructed by ø, is schematically shown in FIG. 6 by system states q1-q5. The scLTL-mission is transmitted to robots 1. As a function of the assumed progress level rise, option q1-q2, which leads from system state q1 to q2, is initially assigned to robot R1, and option q2-q4, which leads from system state q2 to q4, to robot R2. Therefore, the option selected by robot R1 leads robot R1 to $b_i$, and the option selected by robot R2 leads robot R2 to $a_j$. Robot R2 decides to go to $a_i$ instead of $a_2$, because this space $a_i$ is closer, assuming the same probabilities (of 0.5 in each case) that the respective person is located in one of the two spaces $a_i$, $a_2$.

The first replanning takes place after robot R1 reaches space $b_i$. There, it finds person b, who provides a confirmation $b_c$, so that it reaches intermediate state q2. In the meantime, robot R2 is already close to space $a_i$, so that option q2-q4 is assigned thereto, and the corresponding action is executed. In the meantime, option q4-q5 is assigned to robot R1 in order to complete the mission.

If, at this stage, robot R2 determines that access permission $a_c$ is not obtainable in space $a_i$, it is unexpectedly able to complete the action instructions of option q2-q4, and it updates the event probability of the person being located in space $a_i$, to 0, to indicate that access confirmation $a_c$ is not obtainable in space $a_i$. This leads to an updating by which robot R1 is selected as that robot 1 for which the costs for executing option q2-q4 by it moving to $a_2$ are lower since option q4-q5 is assigned to robot R2. Since robot R2 reaches the waypoint more rapidly than robot R1 is able to complete option q2-q4, it may be observed that robot R2 waits for robot R1. Once robot R1 has completed q2-q4, it retains assigned option q4-q5, which is already nearly complete, and completes the mission by entering space r.

The decentralized approach of the auction assignment makes it possible for the example method to be applied to multi-agent systems having any number of robots 1, it being possible to reduce the execution time of the mission by adding further robots 1.

What is claimed is:

1. A method for operating a multi-agent system having a plurality of robots, comprising the following steps:
   cyclically executing, by each of the respective robots, the following method until a target system state is achieved:
      starting from an instantaneous system state, determining possible options where progress is made along a path of system states in a predefined, deterministic finite automaton, the options defining respective actions through which a transition from a current system state to a subsequent system state may be achieved;
      determining a cost value for each option of the possible options to carry out the respective action defined by the option;
      performing an auction, each of the others of the robots considering the cost values ascertained for each of the options; and
      executing an action which corresponds to one of the options, as a function of all of the cost values determined or received for the one of the options;
   wherein each of the system states of the deterministic finite automaton is assigned a corresponding progress level in such a way that the corresponding progress levels rise along multiple different paths to the target system state, and wherein in determining the possible options, only those state transitions are considered which have an increased progress level relative to the corresponding progress level of the current system state.

2. The method as recited in claim 1, wherein the action is carried out that corresponds to the one of the options when the cost value associated with the one of the options is ascertained which indicates a lowest cost of all of the cost values received for the one of the options.

3. The method as recited in claim 1, wherein no action corresponding to the one of the options is taken when there is no intrinsic cost value determined for any of the options which indicates a lowest cost of all cost values received for the one of the options.

4. The method as recited in claim 1, wherein an action is carried out for a further one of the options along the path in the deterministic finite automaton when an intrinsic cost value indicating a lowest cost of all cost values received for the further one of the options, is not ascertained for any of the options, and wherein the further option is selected in such a way that implementing the actions of the options distributed in the auction is not negatively affected by pursuit of an action that corresponds to one of the further options.

5. The method as recited in claim 1, wherein the cost value for each of the options is ascertained as a function of a period of time for executing the action associated with the option and/or of a probability that, upon execution of the action associated with the option, a state condition for the system state is achieved that leads to the option.

6. The method as recited in claim 5, wherein a probability of a state condition for obtaining the system state is achieved upon execution of an action associated with an option, while the execution of the action is updated.

7. The method as recited in claim 1, wherein the progress along the path of system states of the deterministic finite automaton is achieved when there is no possibility that fulfilling a condition of the subsequent system state makes one of the preceding system states attainable.

8. The method as recited in claim 1, wherein, upon completion of the action, the system state obtained is communicated to the others of the robots.

9. The method as recited in claim 1, wherein the execution of the action is interrupted or completed in response to information about a subsequent system state received.

10. The method as recited in claim 1, the cost values ascertained for each of the options are provided by each of the remaining robots explicitly communicating costs.

11. A robot for operating a multi-agent system, the robot being configured for cyclically executing the following steps until a target system state is achieved:
   starting from an instantaneous system state, determining possible options where progress along a path of system states is made in a predefined, deterministic finite automaton, the options defining respective actions through which a transition from a current system state to a subsequent system state can be achieved;
   determining a cost value for each option of the possible options to carry out the respective action defined by the option;
   receiving the cost values ascertained for each of the options from each of the others of the robots;
   performing an auction, taking into account the cost values ascertained for each of the options; and
   executing an action which corresponds to one of cost values determined or received for the respective option;
   wherein each of the system states of the deterministic finite automaton is assigned a corresponding progress level in such a way that the corresponding progress levels rise along multiple different paths to the target system state, and wherein in determining the possible options, only those state transitions are considered which have an increased progress level relative to the corresponding progress level of the current system state.

12. A multi-agent system having a plurality of robots, each of the robots being configured for cyclically executing the following steps until a target system state is achieved:
   starting from an instantaneous system state, determining possible options where progress along a path of system states is made in a predefined, deterministic finite automaton, the options defining respective actions through which a transition from a current system state to a subsequent system state can be achieved;
   determining a cost value for each option of the possible options to carry out the respective action defined by the option;
   receiving the cost values ascertained for each of the options from each of the others of the robots;
   performing an auction, taking into account the cost values ascertained for each of the options; and
   executing an action which corresponds to one of cost values determined or received for the respective option;
   wherein each of the system states of the deterministic finite automaton is assigned a corresponding progress level in such a way that the corresponding progress levels rise along paths to the target system state, and wherein in determining the possible options, only those state transitions are considered which have an increased progress level relative to the corresponding progress level of the current system state.

13. A non-transitory machine-readable storage medium on which is stored a computer program for operating a multi-agent system having a plurality of robots, the computer program, when executed by a computer, causing the computer to perform:
   cyclically executing, by each of the respective robots, the following method until a target system state is achieved:
      starting from an instantaneous system state, determining possible options where progress is made along a path of system states in a predefined, deterministic finite automaton, the options defining respective actions through which a transition from a current system state to a subsequent system state may be achieved;
      determining a cost value for each option of the possible options to carry out the respective action defined by the option;
      performing an auction, each of the others of the robots considering the cost values ascertained for each of the options; and
      executing an action which corresponds to one of the options, as a function of all of the cost values determined or received for the one of the options;
      wherein each of the system states of the deterministic finite automaton is assigned a corresponding progress level in such a way that the corresponding progress levels rise along paths to the target system state, and wherein, in determining the possible options, only those state transitions are considered which have an increased progress level relative to the corresponding progress level of the current system state.

* * * * *